United States Patent [19]

Pringle et al.

[11] Patent Number: 4,983,803
[45] Date of Patent: Jan. 8, 1991

[54] METHOD OF MAKING A SUBSURFACE WELL SAFETY VALVE

[75] Inventors: Ronald E. Pringle, Houston; Arthur J. Morris, Magnolia, both of Tex.

[73] Assignee: Camco International Inc., Houston, Tex.

[21] Appl. No.: 448,429

[22] Filed: Dec. 11, 1989

Related U.S. Application Data

[62] Division of Ser. No. 404,241, Sep. 7, 1989, Pat. No. 4,926,945.

[51] Int. Cl.$^5$ .................. B23H 1/00; B23H 7/02; B23H 9/00; B24B 1/00
[52] U.S. Cl. ................... 219/69.17; 29/890.128; 51/290; 219/69.12
[58] Field of Search ............... 166/321, 323; 29/890.12, 890.126, 890.127, 890.128, 890.129, 890.13, 890.132; 219/69.17, 69.12; 204/129.46, 204 M; 51/34 R, 34 D, 290; 409/84; 427/230, 331

[56] References Cited

U.S. PATENT DOCUMENTS

| | | | |
|---|---|---|---|
| 2,162,578 | 6/1939 | Hacker | 175/248 |
| 2,295,111 | 9/1942 | Hemmings | 29/890.125 |
| 2,381,572 | 8/1945 | Caldwell | 51/34 D |
| 3,052,013 | 9/1962 | Kane | 219/69.17 |
| 3,271,845 | 9/1966 | Breher | 29/890.127 |
| 3,833,988 | 9/1974 | Tobias | 29/890.132 |
| 4,531,587 | 7/1985 | Fineberg | 166/332 |
| 4,596,501 | 6/1986 | Wu | 409/84 |

FOREIGN PATENT DOCUMENTS

| | | | |
|---|---|---|---|
| 120973 | 9/1980 | Japan | 51/290 |
| 1355464 | 11/1987 | U.S.S.R. | 51/290 |

*Primary Examiner*—Geoffrey S. Evans
*Attorney, Agent, or Firm*—Fulbright & Jaworski

[57] ABSTRACT

A subsurface safety valve is made by the steps of coating a hard seat in the inside surface of a circular tubular member, honing the inside of the tubular member, drilling a hole in a circular plane perpendicular to the axis of the tubular member to form hinge holes in the future cut out valve closure members, and then cutting hinges out of circular sectors of the tubular member. Preferably the cutting is performed using a wire electrode of a wire cutting electric discharge machine, although cutting may be performed by a mill or a chemical machine.

11 Claims, 4 Drawing Sheets

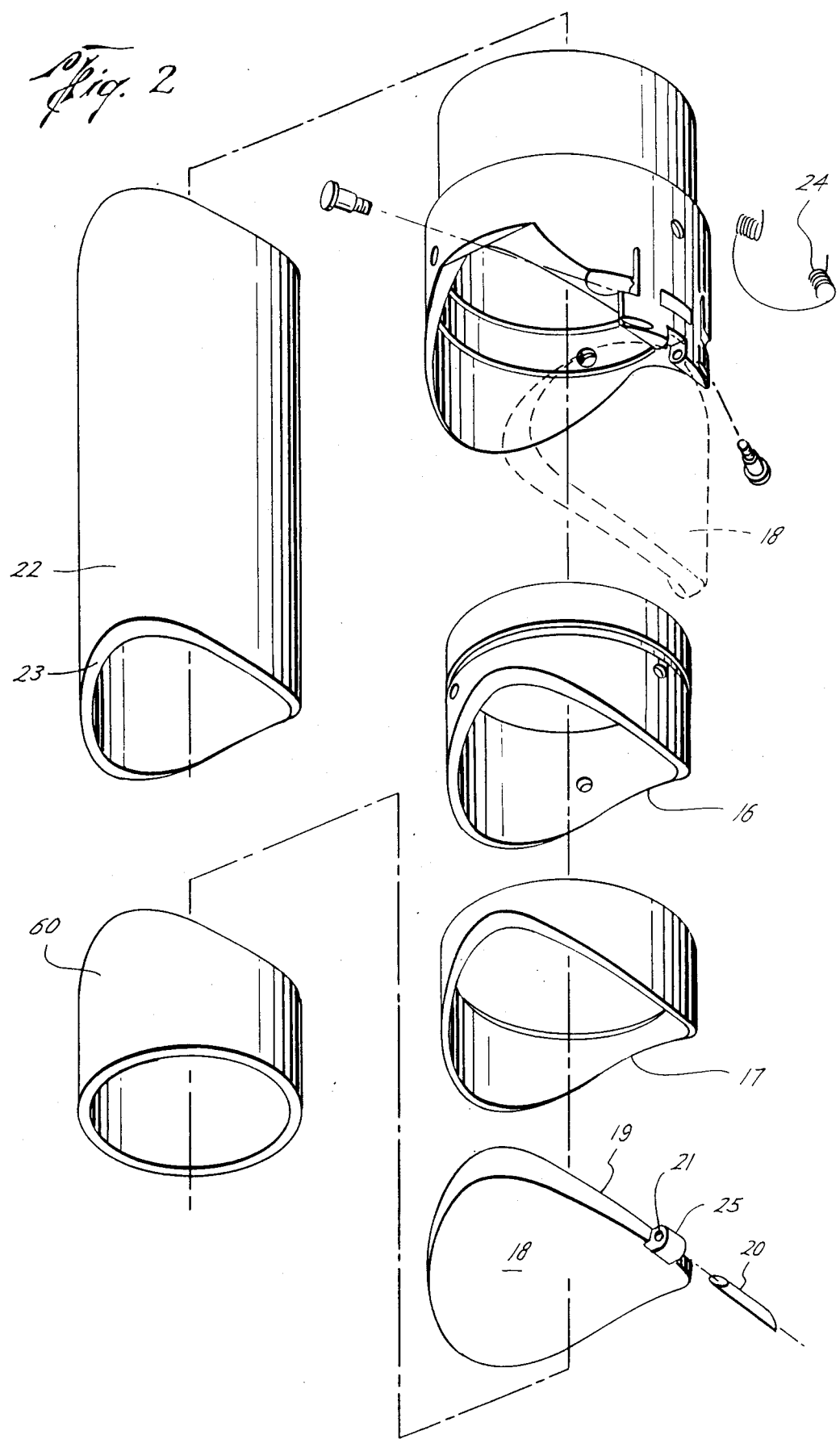

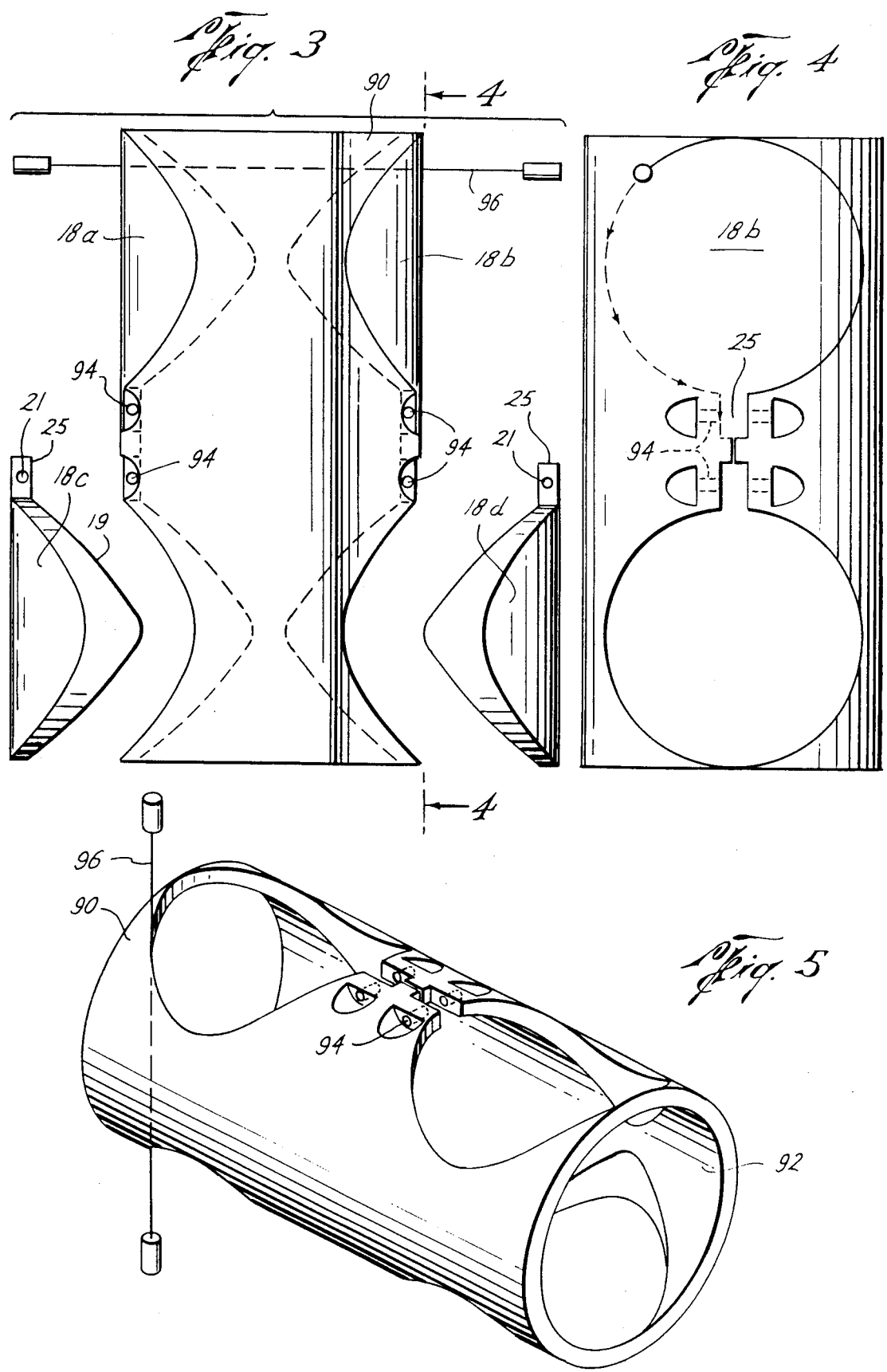

METHOD OF MAKING A SUBSURFACE WELL SAFETY VALVE

This is a division of application Ser. No. 07/404,241, filed Sept. 7, 1989 now U.S. Pat. No. 4,926,945.

BACKGROUND OF THE INVENTION

It is known that a curved or arcuate flapper valve may be used in a subsurface well safety valve to provide a larger bore in the safety valve as compared to a flat flapper valve. Such valves as described in U.S. Pat. Nos. 2,162,578; 4,531,587; and U.S. patent application Ser. No. 07/255,818, filed Oct. 11, 1988, are designed to provide larger bores and thus increase the well production through the valve. However, such valves were complicated to manufacture generally requiring a multi-axis mill and were quite expensive. Conventional curved flappers utilize a seat which required developing the seat line by two diameters. Furthermore, the prior art curved flapper valves, which were operated by a flow tube, retracted the flow tube away from the flapper in the closed position thereby increasing the length, expense and spring-operating parameter requirements.

The present invention is directed to an improved well safety valve having a curved flapper in which the flapper has a sealing surface on its interior or inside diameter and developed by one diameter as distinguished from valves having a seat surface developed by two diameters. Furthermore, the present valve includes a flow tube having a lower end contoured to coact with the flapper for reducing the overall length of the safety valve, reducing the required spring parameters, and thereby reducing the cost of the valve. Furthermore, the method of making the flapper of the present invention provides flappers by different manufacturing methods whereby the cost of the flapper is significantly reduced from curved flappers manufactured on multi-axis milling machines.

SUMMARY

One feature of the present invention is the provision of a subsurface well safety valve for controlling the fluid flow through a well conduit which includes a housing having an axial bore therethrough and a valve seat positioned in the housing. A valve closure member is movable between open and close positions relative to the valve seat and the valve closure member is a sector of a cylinder having a concave surface which forms a sealing surface. The valve seat has a seating surface contoured to coact with the sealing surface. A flow tube is telescopically movable in the housing for controlling the movement of the valve closure member and the lower end of the flow tube has a surface having a contour substantially equal to the contour of the concave seating surface. Preferably, the contour of the lower end of the flow tube is a cylindrical surface having a radius substantially equal to the radius of the concave sealing surface. Hydraulic piston and cylinder means are provided in the housing for actuating the flow tube.

Still a further object of the present invention is wherein the lower end of the flow tube is positioned closely adjacent the concave sealing surface of the valve closure member when the safety valve is in the closed position. This reduces the travel required of the flow tube, reduces the length of the safety valve, reduces the requirements of the spring biasing means, reduces the spring requirements, and consequently, reduces the valve cost.

Yet a still further object of the present invention is the provision of a resilient seat encircling the valve seat and having a seating surface contoured to coact with the sealing surface.

Yet a further object of the present invention is the method of making an arcuate valve closure member for a subsurface well safety valve which includes honing the inside of a circular tubular member for providing a finished concave sealing surface and cutting a circular sector with a hinge out of the tubular member.

Still a further object of the present invention is cutting a second circular section with a hinge out of the tubular member wherein the second sector is diametrically opposite to the first sector. Preferably, the method includes wherein the first and second sectors and hinges are simultaneously cut out of the tubular member.

Yet a further object is wherein the cutting is performed by an electronic discharge machine.

A still further object is wherein holes are drilled into the tubular member before cutting out the circular sectors and hinge for forming a hinge hole in the cutout valve closure member. Preferably, the hinge includes a longitudinal axis and the hinge axis is cut out of a portion of the tubular member which is parallel to the longitudinal axis of the tubular member.

Yet a still further object of the present invention is applying a sprayed on hard seat to the inside of the tubular member prior to honing.

A still further object is the provision of a molded ceramic seat for providing a high compressive strength material which is corrosion resistant.

Other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

FIG. 2 is an exploded perspective view of the curved flapper of the present invention and its coacting parts, FIG. 3 is an elevational view illustrating the method of making a curved flapper according to the present invention, FIG. 4 is a cross-sectional view taken along the line 4—4 of FIG. 3, FIG. 5 is an elevational perspective of FIG. 4.

DESCRIPTION OF THE PREFERRED EMBODIMENT

While the present invention may be utilized in various types and configurations of subsurface well safety valves, it will be described, for purposes of illustration only, of the type shown in patent application Serial No. 07/255,818, as this embodiment provides a safety valve with a maximum bore opening.

Figure 1A:
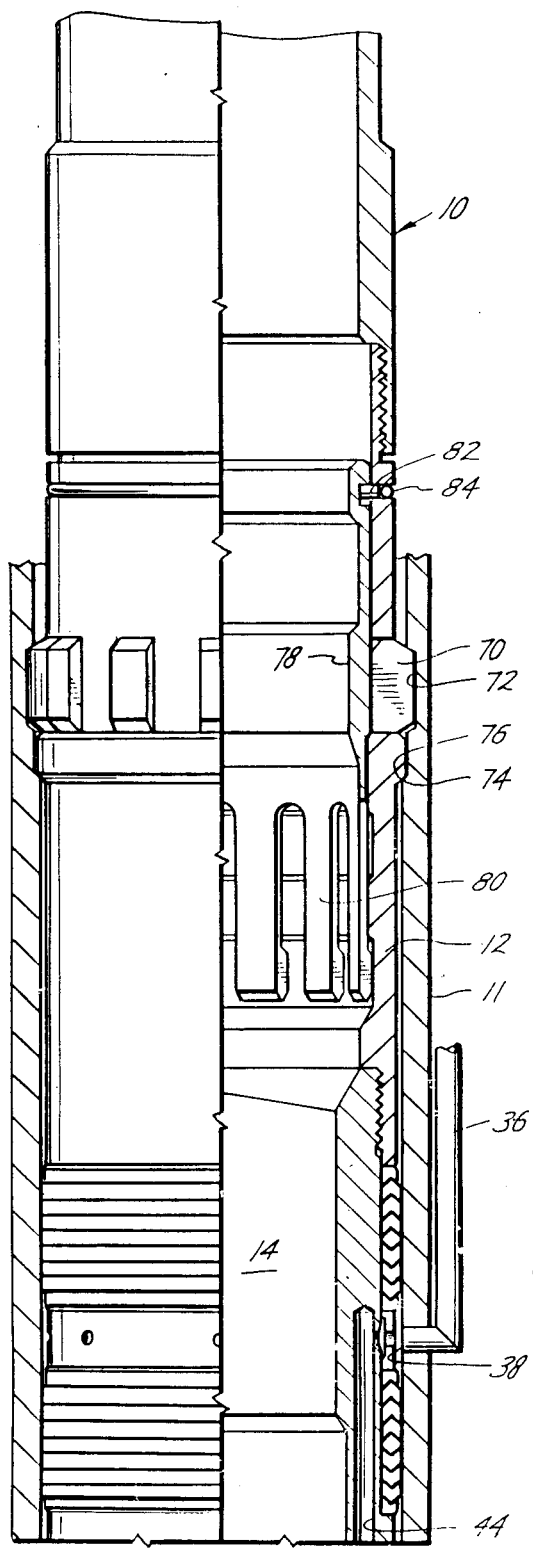
FIGS. 1A, 1B and 1C are continuations of each other an re an elevational view, partly in cross section, illustrating a valve using the present invention and shown in the open position.
Figure 1B:
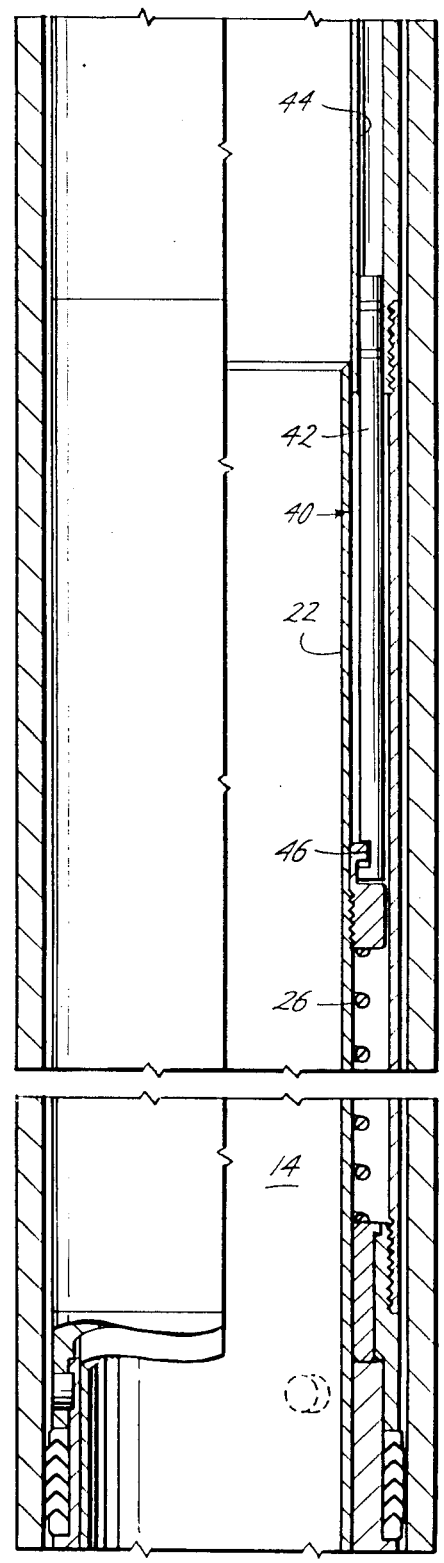
Figure 1C:
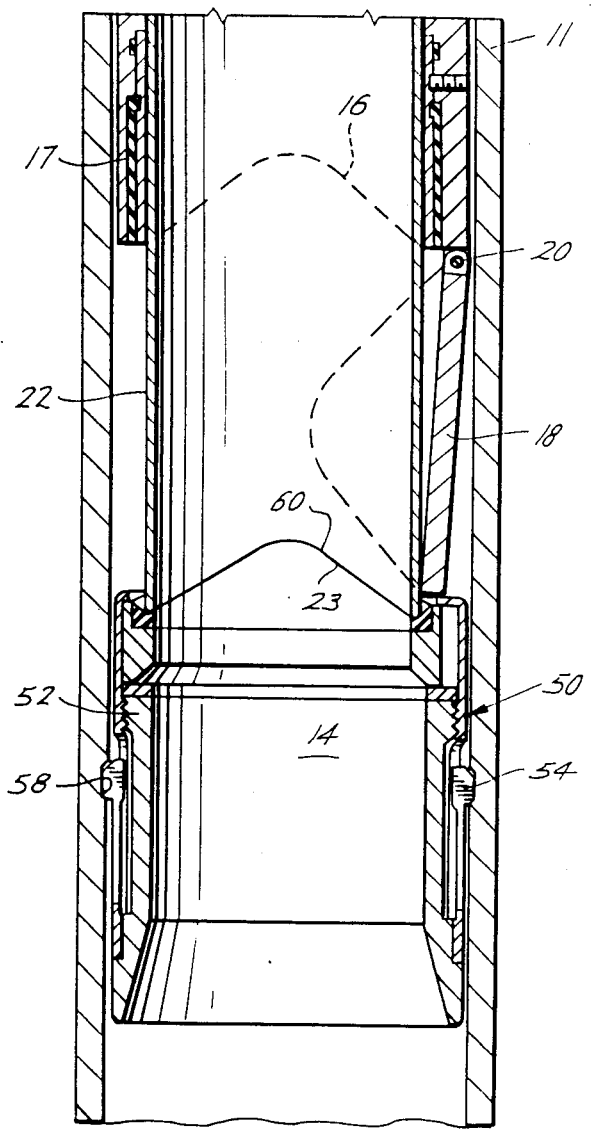

Referring now to the drawings, and particularly to FIGS. 1A, 1B and 1C, the reference numeral 10 generally indicates a retrievable subsurface tubing safety valve which includes the present invention. The valve includes a housing 12 and is adapted to be set in or retrieved from a well tubing which includes a landing nipple generally indicated by the reference numeral 11 to permit well production therethrough under normal operating conditions, but in which the safety valve 10 may be closed in response to abnormal conditions.

The valve 10 includes an axial bore 14, a curved valve seat 16 (FIG. 1C) positioned about the bore 14 in the housing 12, a valve closure member such as curved flapper 18 which is in the form of a curved cross-sectional shape, as will be more fully discussed hereinafter, is connected to the body 12 by pivot pin 20. Thus, when the flapper 18 is in the upper position and seated on the valve seat 16 (FIG. 6), the safety valve 10 is closed blocking flow upwardly through the bore 14 and well tubing. A flow tube or longitudinal tubular member 22 is telescopically movable in the body 12 and through the valve seat 16. As best seen in FIG. 1C when the flow tube 22 is moved to a downward position, the tube 22 pushes the flapper 18 away from the valve seat 16. Thus, the valve 10 is held in the open position so long as the tube 22 is in the downward position. When the tube is moved upwardly, the flapper 18 is allowed to move upwardly onto the seat 16 by the action of a spring 24 and also by the action of fluid flow moving upwardly through the bore 14.

The flow tube 22 is biased in an upward direction by a suitable means which may include a spring 26 (FIG. 1B) for yieldably urging the flow tube 22 in an upward direction to release the flapper 18 for closing the valve 10. The safety valve 10 is operated by the application or removal of a pressurized fluid, such as hydraulic fluid, through a control path or line such as control line 36 extending to the well surface from a port 38 in the housing 12 for supplying pressurized fluid to the top of a piston and cylinder means or assembly generally indicated by the reference numeral 40. The assembly 40 includes a piston 42 movable in a cylinder 44, one of which, here shown as the piston 42, may be connected to the flow tube 22 by a tongue and groove connection 46.

As best seen in FIG. 1C, a nose, generally indicated by the reference numeral 50, is provided which is positioned in the landing nipple 11 in the bottom of the housing 12. The nose 50 includes a body 52 and means for connection to the inside of the nipple 11 such as collet fingers 54 which engage and latch into a nose latching recess 58 in the landing nipple 11. The body 52 carries a seal 60 for engagement by the flow tube 22 when it is in the downward position. When the valve is in the open position and the flow tube 22 seats against the seal 60, the flapper 18 and valve seat 16 are protected against erosion by production fluid. The nose 50 may be installed into the landing nipple 11 by a suitable well prong which lowers the nose 50 into the nipple 11 until the fingers 54 engage the recess 58 at which time the prong may be released from the nose 50 and retrieved. Thereafter, the housing 12 of the safety valve 10 is installed in the landing nipple 11.

Referring now to FIG. 1A, the valve 10 is generally run into the well conduit and landing nipple 11 on a wireline or pumpdown, for example, a Camco wireline running tool. The housing 12 includes suitable means for connection to the inside of the landing nipple 11 such as locking dogs 70 which are in the retracted position while being run in but are here shown as set in a housing latching recess 72 in the landing nipple 11. The housing is normally run into the nipple 11 until a no-go shoulder 74 on the housing 12 engages a stop shoulder 76 in the landing nipple 11. Thereafter, a sleeve 78 is moved downwardly to latch the dogs 70 outwardly into the recess 72. The sleeve 78 is held in a releasably latched position by collet fingers 80 and pins 82 biased inwardly by a garter spring 84.

The above description is generally disclosed in patent application Ser. No. 07/255,818, which is herewith incorporated by reference.

Figure 6:
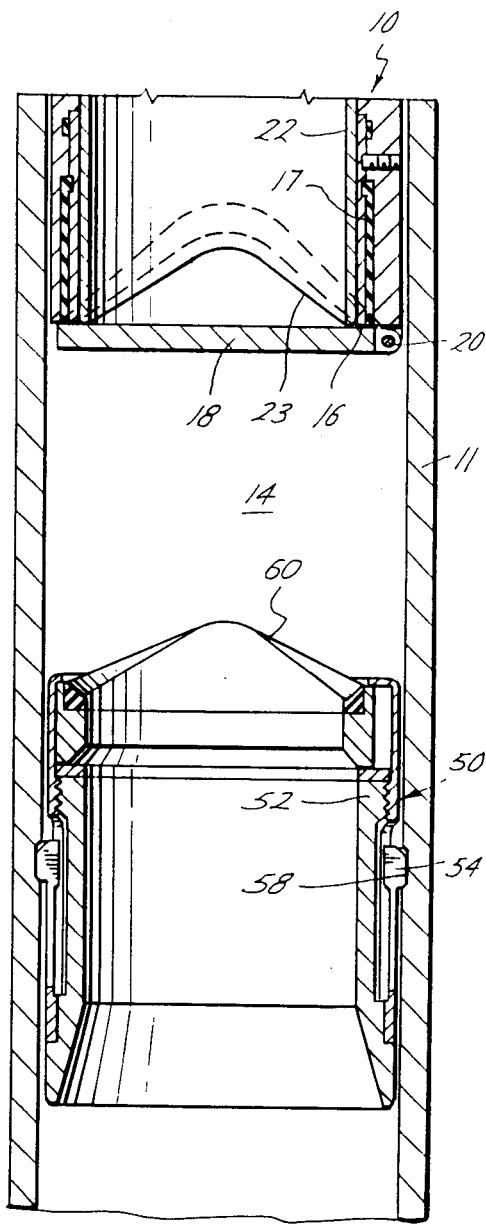
FIG. 6 is a fragmentary elevational view, partly in cross section, of the valve shown in the closed position.

Referring now to FIGS. 1C, 2 and 6, the coaction between the valve closure member or flapper 18 and its coacting elements of the valve 10 is best seen. First, the flapper 18 is a sector of a cylinder and includes an internal diameter or concave surface 19 which forms a sealing surface. The valve seat 16 includes a coacting seating surface contoured to coact with the sealing surface 19. Preferably, the valve seat 16 is metal to form a metal-to-metal seal with the flapper 18. In addition, if desired, a soft seat insert 17 may be provided positioned about the outer periphery of the hard seat 16 and which is also contoured to coact with the sealing surface 19. The soft seal 17 may be of any suitable material such as an elastomer. However, if desired, the seat 16 may be a molded ceramic insert which provides a low cost hard seat. The ceramic seat has a high compressive strength and is corrosion resistant. Any suitable ceramic may be used such as silicon nitride of zirconia. In any event it is preferable for the seat 16 to have a thermal fit and/or brazed or welded to the metal housing 12.

FIG. 1C illustrates the position of the valve closure member 18 and flow tube 22 when the valve 10 is in the open position, and FIG. 6 illustrates the position of these elements when the valve 10 is in the closed position. Referring to FIGS. 1C, 2 and 6, it is to be noted that the lower end 23 of the flow tube 22 has a surface 23 having a contour substantially equal to the contour of the concave sealing surface 19 of the flapper 18. That is, the lower end 23 of the flow tube 22 is a cylindrical surface having a radius substantially equal to the radius of the concave sealing surface 19. This feature advantageously allows the lower end 23 of the flow tube 22 to be positioned closely adjacent to the concave sealing surface 19 of the valve closure member or flapper 18 when the safety valve 10 is in the closed position as best seen in FIG. 6. That is, if the lower end of the flow tube 22 were flat, the flow tube 22 must be retracted a greater distance in order to allow the flapper 18 to close. However, if the contour of the lower end of the flow tube 22 is the same as the internal diameter 19 of the flapper 18 or less, the contact point between the flow tube 22 and the flapper 18 will begin to open the flapper 18 immediately on downward movement of the flow tube 22. Thus, the stroke of the flow tube 22 will be the same as in conventional flat flapper valve closure element valves. Without the contour of lower end 23, the flow tube 22 would be required to retract a greater distance lengthening the length of the safety valve 10, increasing its cost, requiring greater strength and expense out of the biasing spring 26, and undesirably increasing the spring 26 spread.

Since it is desired that the lower end 23 of the flow tube 22 cover the flapper 18 when it is in the open position, as best seen in FIG. 1C, and protect the flapper 18 from erosion, the contour 60 of the nose seal is contoured to mate with and coact with the lower end 23 of the flow tube 22.

Previously manufactured arcuate flappers generally require multiple diameters to define the flapper sealing surface, and required multiple axis milling machines to manufacture the flapper. However, by using a single diameter to obtain the sealing surface 19, it has been found that by using the present method of manufacture that flappers can be manufactured at significantly lower costs.

The method of making the arcuate valve closure member or flapper 18 for a subsurface well safety valve is best seen in FIGS. 3, 4 and 5. First, a length of a circular tubular member 90 is provided of whatever type of metal it is desired to make the flappers 18. The inside 92 is honed whereby the internal diameter of the tube 90 provides the finished sealing surface 19 for the flappers 18. The length of the tubular member 90 is selected depending upon the number of flappers 18 it is desired to manufacture at one time. In the example given in FIGS. 3, 4 and 5, a sufficient length of tube is shown to manufacture four flappers 18 for purposes of illustration only. If desired, the internal diameter or sealing surface 92 may be provided with a hard seat such as by ceramic spray such as zirconia or silicon nitride. This provides a low cost hard sealing. Of course, with a coating, the internal diameter 92 would then be honed or lapped, such as to a 0.020 micron finish. In any event, it is preferable to hone or lap the interior 92 of the tubular member 90 to provide all of the sealing surfaces for a multiplicity of flappers 18 which are to be manufactured out of the tubular member 90.

Next, it is desired to drill holes 94 in the tubular member 90 before machining the flappers 18. The drilled holes 94 form the hinge holes 21 in the hinges 25 of the flappers 18.

Thereafter, when the flappers 18 along with their hinges 25 are cut out of the tubular member 90, the hinge holes 21 are all prepared to receive the pivot pin 20 (FIGS. 1C, 6 and 2). The hinge 25 includes a longitudinal axis and the hinge axis is preferably cut out of a portion of the tubular member 90 which is parallel to the longitudinal axis of the tubular member 90. That is, the holes 94 are drilled through the tubular member 90 in a circular plane that is perpendicular to the axis of the tubular member thereby forming hinge holes in the cutout valve closure member or flapper 18.

The sealing surface 19 of the flappers 18 is formed by two right-angle intersections of a cylindrical tube, preferably, the cutting operation is performed by rotating the tubular member 90 about its own axis so that the cutting tool 96 defines a cylindrical surface and the periphery of the hinges 25. Preferably, the cutting tool 96 is an electric discharge machine although a regular mill or chemical machines, may be utilized. In any event, the cutting tool 96 cuts a circular section out of the tubular member 90 with a hinge. Preferably, a second circular sector with a hinge is also cut out of the tubular member wherein the second sector is diametrically opposed to the first sector. Thus, as best seen in FIG. 3, first and second flapper valves 18a and 18a are cut out of the tubular member 90 and the flappers 18a and 18b are diametrically opposite to each other in the tubular member 90. Preferably, the cutting tool 96 simultaneously cuts out both flappers 18a and 18b at the same time.

In addition, referring to FIG. 2, the coacting surfaces on the flow tube 22 and the nose seal 60 may be cut out of a single tubular member for reducing cost and insuring a mating fit between the members 22 and 60. Similarly, the hard metal seat 16 and the soft metal seat 17 may be simultaneously made by telescoping a tubular soft material over a tubular hard material and simultaneously cutting the surfaces 16 and 17. Therefore, the present manufacturing method provides a quick, inexpensive, but superior method of making multiple valve closure members or flappers 18 by providing a finished machine flapper 18 when the cylindrical sectors are cut out of the tubular member 90.

The present invention, therefore, is well adapted to carry out the objects and attain the ends and advantages mentioned as well as others inherent therein. While a presently preferred embodiment of the invention has been given for the purpose of disclosure, numerous changes in the detail of construction and arrangement of parts, and steps of the method will be readily apparent to those skilled in the art and which are encompassed within the spirit of the invention and the scope of the appended claims.

What is claimed is:

1. A method of making an arcuate valve closure member for a subsurface well safety valve comprising,
   honing the inside of a circular tubular member for providing a finished concave sealing surface, and
   cutting a circular sector with a hinge out of the tubular member.

2. The method of claim 1, including,
   cutting a second circular sector with a hinge out of the tubular member wherein the second sector is diametrically opposite to the first sector.

3. The method of claim 2 wherein the first and second sectors and hinges are simultaneously cut out of the tubular member.

4. The method of claim 1 wherein the cutting is performed by an electric discharge machine.

5. The method of claim 1 wherein holes are drilled into the tubular member before cutting out the circular sector and hinge for forming a hinge hole in the cut out valve closure member.

6. The method of claim 1 wherein the hinge includes a longitudinal axis and the hinge axis is cut out of a portion of the tubular member which is parallel to the longitudinal axis of the tubular member.

7. The method of claim 1 including,
   applying a hard seat coating to the inside of the tubular member prior to honing.

8. A method of making an arcuate valve closure member for a subsurface safety valve comprising,
   honing the inside of a circular tubular member for providing a finished concave seat surface,
   simultaneously cutting first and second circular sectors, each of which includes a hinge, out of the tubular member wherein the second sector is diametrically opposite to the first sector, and
   prior to cutting out the sectors, drilling a hole through the tubular member in a circular plane perpendicular to the axis of the tubular member for forming hinge holes in the cut out valve closure members.

9. The method of claim 8 wherein the cutting is performed by an electric discharge machine.

10. The method of claim 8 wherein the hinge includes a longitudinal axis and the hinge axis is cut out of a portion of the tubular member which is parallel to the longitudinal axis of the tubular member.

11. The method of claim 8 including,
    applying a ceramic hard seat to the inside of the tubular member prior to honing.

* * * * *